(12) United States Patent
Li et al.

(10) Patent No.: US 9,117,138 B2
(45) Date of Patent: Aug. 25, 2015

(54) METHOD AND APPARATUS FOR OBJECT POSITIONING BY USING DEPTH IMAGES

(71) Applicant: INDUSTRIAL TECHNOLOGY RESEARCH INSTITUTE, Hsinchu (TW)

(72) Inventors: Chia-Chang Li, Pingtung (TW); Duan-Li Liao, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 283 days.

(21) Appl. No.: 13/726,454

(22) Filed: Dec. 24, 2012

(65) Prior Publication Data

US 2014/0064602 A1   Mar. 6, 2014

(30) Foreign Application Priority Data

Sep. 5, 2012 (TW) .............................. 101132330 A (51) Int. Cl.
*G06K 9/00* (2006.01)
*G06K 9/46* (2006.01)
*G06T 7/00* (2006.01)

(52) U.S. Cl.
CPC .......... *G06K 9/4604* (2013.01); *G06K 9/00375* (2013.01); *G06T 7/0042* (2013.01); *G06T 2207/10028* (2013.01); *G06T 2207/30196* (2013.01)

(58) Field of Classification Search
CPC ............... G06K 9/4604; G06T 7/0042; G06T 2207/10028
USPC .......................................................... 382/154
See application file for complete search history.

(56) References Cited

U.S. PATENT DOCUMENTS

| | | | |
|---|---|---|---|
| 5,937,079 A | 8/1999 | Franke | |
| 6,154,558 A | 11/2000 | Hsieh | |
| 6,173,066 B1 | 1/2001 | Peurach et al. | |
| 6,185,314 B1 * | 2/2001 | Crabtree et al. | .............. 382/103 |
| 6,198,485 B1 | 3/2001 | Mack et al. | |
| 6,434,255 B1 | 8/2002 | Harakawa | |

(Continued)

FOREIGN PATENT DOCUMENTS

| | | |
|---|---|---|
| TW | 484303 | 4/2002 |
| TW | 501035 | 9/2002 |

(Continued)

OTHER PUBLICATIONS

Hu et al., "Human arm estimation using convex features in depth images", Image Processing (ICIP), 2010 17th IEEE International Conference, p. 3269-p. 3272, Sep. 2010.

(Continued)

*Primary Examiner* — Samir Ahmed
(74) *Attorney, Agent, or Firm* — Rabin & Berdo, P.C.

(57) ABSTRACT

According to an exemplary embodiment, a method for object positioning by using depth images is executed by a hardware processor as following: converting depth information of each of a plurality of pixels in each of one or more depth images into a real world coordinate; based on the real world coordinate, computing a distance of each pixel to an edge in each of a plurality of directions; assigning a weight to the distance of each pixel to each edge; and based on the weight of the distance of each pixel to each edge and a weight limit, selecting one or more extremity positions of an object.

18 Claims, 11 Drawing Sheets

(56) References Cited

U.S. PATENT DOCUMENTS

| | | |
|---|---|---|
| 6,658,136 B1 | 12/2003 | Brumitt |
| 6,674,877 B1 | 1/2004 | Jojic et al. |
| 6,690,451 B1 | 2/2004 | Schubert |
| 6,788,809 B1 | 9/2004 | Grzeszczuk et al. |
| 7,283,676 B2 | 10/2007 | Olsson |
| 7,319,479 B1* | 1/2008 | Crabtree et al. ............. 348/169 |
| 7,340,077 B2 | 3/2008 | Gokturk et al. |
| 7,372,977 B2 | 5/2008 | Fujimura et al. |
| 7,590,262 B2 | 9/2009 | Fujimura et al. |
| 7,781,666 B2 | 8/2010 | Nishitani et al. |
| 7,971,157 B2 | 6/2011 | Markovic et al. |
| 7,974,443 B2 | 7/2011 | Kipman et al. |
| 7,996,793 B2 | 8/2011 | Latta et al. |
| 8,031,906 B2 | 10/2011 | Fujimura et al. |
| 8,113,991 B2 | 2/2012 | Kutliroff |
| 2005/0131581 A1* | 6/2005 | Sabe et al. .................... 700/245 |
| 2005/0180602 A1 | 8/2005 | Yang et al. |
| 2005/0185834 A1 | 8/2005 | Kristjansson et al. |
| 2005/0196015 A1 | 9/2005 | Luo et al. |
| 2005/0201612 A1 | 9/2005 | Park et al. |
| 2008/0101652 A1 | 5/2008 | Zhao et al. |
| 2008/0159591 A1 | 7/2008 | Ruedin |
| 2008/0170749 A1 | 7/2008 | Albertson et al. |
| 2009/0010490 A1 | 1/2009 | Wang et al. |
| 2009/0028440 A1* | 1/2009 | Elangovan et al. ........... 382/216 |
| 2009/0161914 A1* | 6/2009 | Song ............................ 382/106 |
| 2010/0014710 A1 | 1/2010 | Chen et al. |
| 2010/0092038 A1 | 4/2010 | Theodore et al. |
| 2010/0111444 A1* | 5/2010 | Coffman ...................... 382/285 |
| 2010/0160835 A1 | 6/2010 | Shin et al. |
| 2010/0166258 A1 | 7/2010 | Chai et al. |
| 2010/0166259 A1 | 7/2010 | Otsu et al. |
| 2010/0215257 A1 | 8/2010 | Dariush et al. |
| 2010/0302247 A1 | 12/2010 | Perez et al. |
| 2011/0080336 A1 | 4/2011 | Leyvand et al. |
| 2011/0080475 A1 | 4/2011 | Lee et al. |
| 2011/0093820 A1 | 4/2011 | Zhang et al. |
| 2011/0119216 A1 | 5/2011 | Wigdor |
| 2011/0193939 A1 | 8/2011 | Vassigh et al. |
| 2011/0199291 A1 | 8/2011 | Tossell et al. |
| 2011/0206273 A1 | 8/2011 | Plagemann et al. |
| 2011/0211754 A1 | 9/2011 | Litvak et al. |
| 2011/0219340 A1 | 9/2011 | Pathangay et al. |
| 2011/0228981 A1 | 9/2011 | Harres et al. |
| 2011/0234490 A1 | 9/2011 | Markovic et al. |
| 2011/0234589 A1 | 9/2011 | Lee et al. |
| 2011/0246329 A1 | 10/2011 | Geisner et al. |
| 2011/0255746 A1 | 10/2011 | Berkovich et al. |
| 2011/0262002 A1 | 10/2011 | Lee |
| 2011/0279368 A1 | 11/2011 | Klein et al. |
| 2011/0279663 A1 | 11/2011 | Fan et al. |
| 2011/0285626 A1 | 11/2011 | Latta et al. |
| 2011/0289455 A1 | 11/2011 | Reville et al. |
| 2011/0293137 A1 | 12/2011 | Gurman et al. |
| 2011/0299774 A1 | 12/2011 | Manders et al. |
| 2011/0302293 A1 | 12/2011 | Buban |
| 2012/0027252 A1 | 2/2012 | Liu et al. |
| 2012/0038932 A1* | 2/2012 | Lenz et al. .................... 356/601 |
| 2012/0084652 A1* | 4/2012 | Martinez Bauza et al. ... 715/719 |
| 2012/0229628 A1* | 9/2012 | Ishiyama et al. ............. 348/135 |

FOREIGN PATENT DOCUMENTS

| | | |
|---|---|---|
| TW | I223712 | 11/2004 |
| TW | 200522709 | 7/2005 |
| TW | I270824 | 1/2007 |
| TW | I274296 | 2/2007 |
| TW | 200744148 | 12/2007 |
| TW | 200842733 | 11/2008 |
| TW | I307052 | 3/2009 |
| TW | 200937350 | 9/2009 |
| TW | I326049 | 6/2010 |
| TW | 201025150 | 7/2010 |
| TW | I328727 | 8/2010 |
| TW | I333783 | 11/2010 |
| TW | 201044285 | 12/2010 |
| TW | 201121314 | 6/2011 |
| TW | 201137766 | 11/2011 |
| TW | 201145119 | 12/2011 |
| TW | 201145184 | 12/2011 |
| TW | 201203131 | 1/2012 |
| TW | 201214242 | 4/2012 |
| TW | 201214244 | 4/2012 |
| TW | 201218047 | 5/2012 |

OTHER PUBLICATIONS

Li et al., "Local Shape Context Based Real-time Endpoint Body Part Detection and Identification from Depth Images", Computer and Robot Vision (CRV), 2011 Canadian Conference, p. 219-p. 226, May 2011.

Chen et al., "Real-time hand tracking on depth images", Visual Communications and Image Processing (VCIP), 2011 IEEE, p. 1-p. 4, Nov. 2011.

Xu et al;., "Integrated approach of skin-color detection and depth information for hand and face localization", Robotics and Biomimetics (ROBIO), 2011 IEEE International Conference, p. 952-p. 956, Dec. 2011.

Pham et al;., "Dual hand extraction using skin color and stereo information", Robotics and Biomimetics, ROBIO 2008. IEEE International Conference, Feb. 2009, p. 330-p. 335, 2008.

* cited by examiner

METHOD AND APPARATUS FOR OBJECT POSITIONING BY USING DEPTH IMAGES

CROSS-REFERENCE TO RELATED APPLICATION

The present application is based on, and claims priority from, Taiwan Patent Application No. 101132330, filed Sep. 5, 2012, the disclosure of which is hereby incorporated by reference herein in its entirety.

TECHNICAL FIELD

The present disclosure relates generally to a method and apparatus for object positioning by using depth images.

BACKGROUND

In the past, a visual interactive based human-machine interactive system uses single camera or color information to analyze the image. Under some conditions, such as the user closing to the background color, or changing ambient light, or the complex background of many people, this kind of technology is likely to cause insufficient image recognition rate. The existing technologies use the information of a depth image to aid the image analysis. For example, some technologies may use depth images to track a user's local area, or capture and track the extremity position of the user, or perform detection on one or more extremities of a human target. Some techniques may use such as color and depth information to find hand position, or hand area and facial area.

Figure 1:
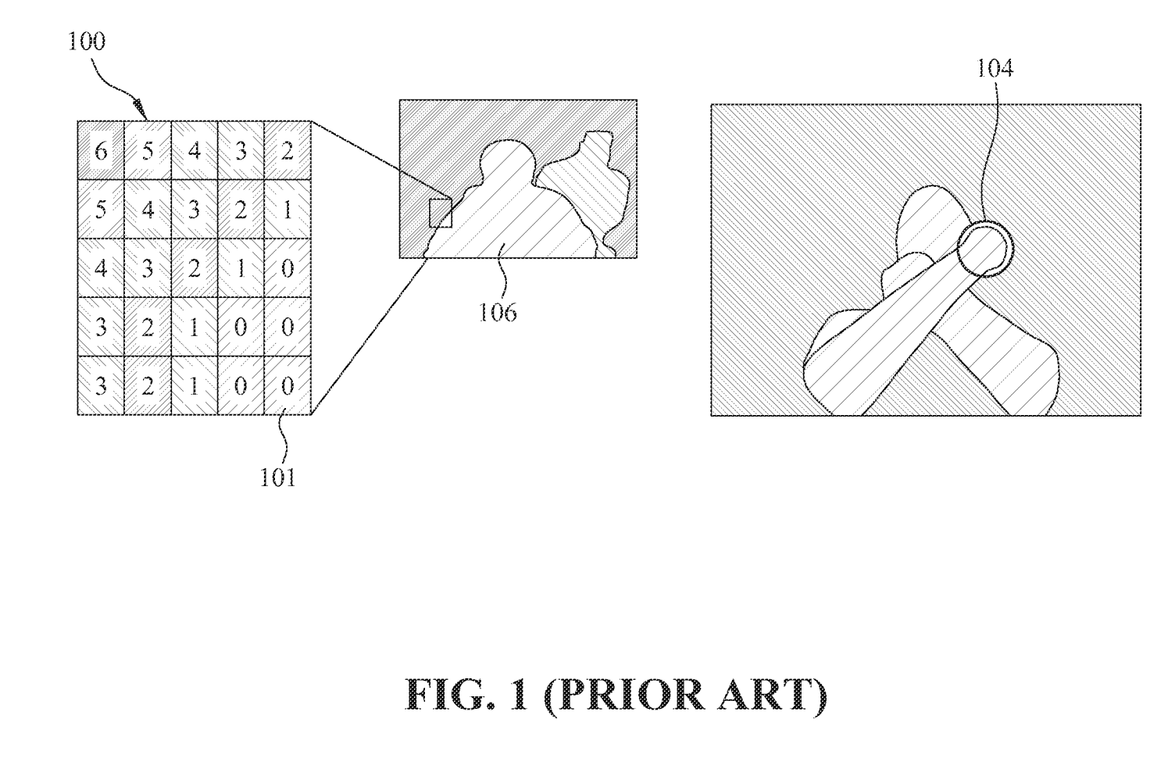
FIG. 1 shows a schematic view of a technology using depth images to track user's local area.

A technology uses the depth image to track the user's local area, such as shown in FIG. 1. This technology finds the edge of the target 106 from a depth image and finds a best fit pre-defined contour shape from the edge, such as a contour shape 104 of the right hand of the target 106, wherein a depth image has a corresponding sample edge potential transform map 100. For example, the sample edge potential transform map 100 includes a modeled target to be tracked in a potential field, and the value of each grid point in the sample edge potential transform map 100 indicates how far the grid point from the edge 101 of the target object 106. When the distance of the target and the camera changes, the size of the contour shape will vary accordingly. This technique requires a plurality of pre-defined contour shapes.

Another technology using a depth image to capture and track extremity position of user produces the grid of voxels from the depth image, removes the background grids of voxels and isolates the user, then finds the extremity location of the user from the isolated user. In other words, this technology finds the extremity location of the user through creating a three dimensional grids and removing background to isolate human target.

Figure 2:
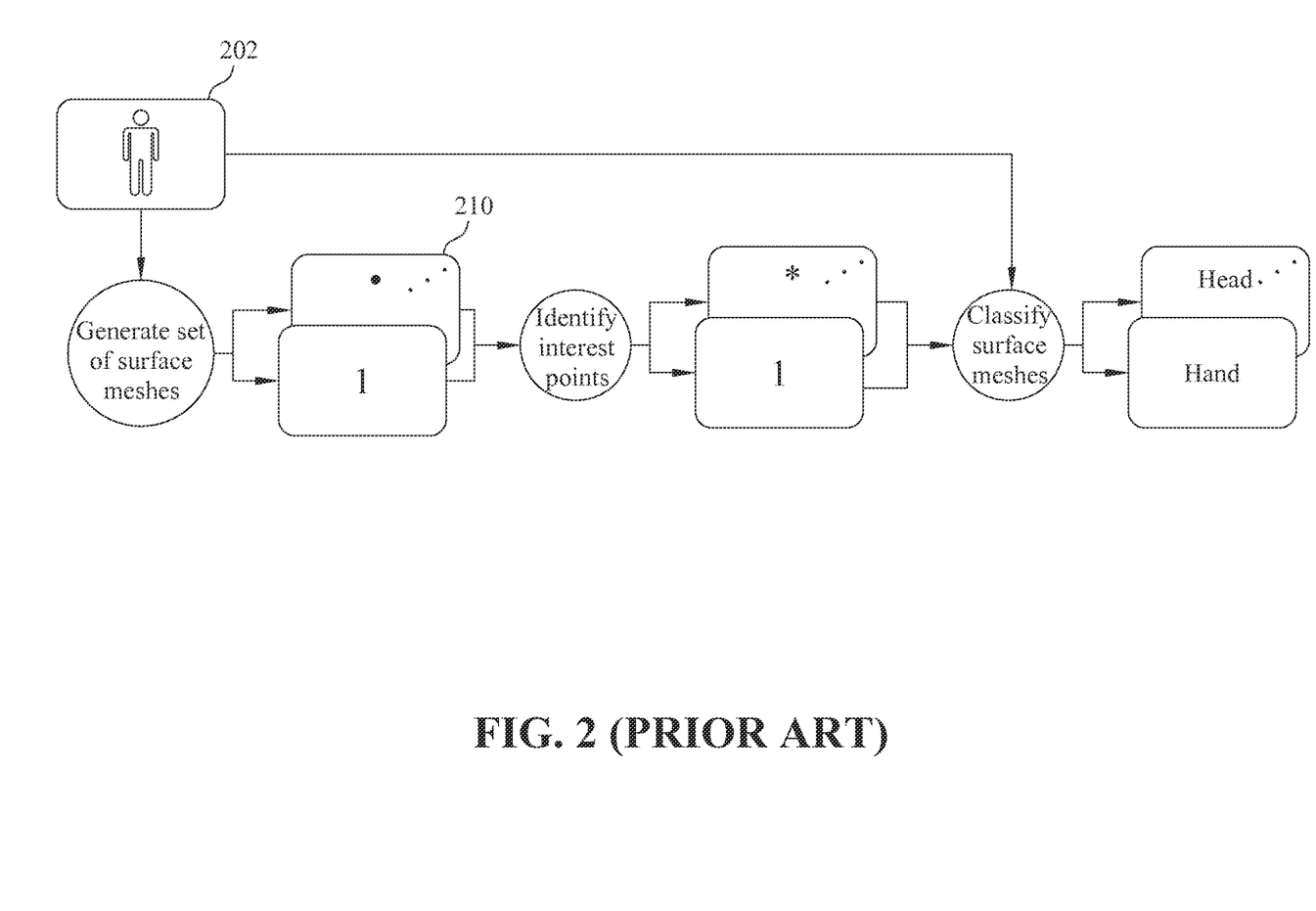
FIG. 2 shows a schematic view of a technology using depth images to identify extremities of each part of the users body.

Yet another technology uses depth images to identify extremities of each part of the user's body such as shown in FIG. 2. This technology generates a three-dimensional set of surface meshes 210 from the data of the depth image 202, then calculates geodesic distances of each grid point in the set of surface meshes, and classifies surface meshes in this set according to the lengths of different paths. Each mesh corresponds to a body part such as head, hand, feet, shoulders, or other body parts. In other words, this technique finds out the extremity position of each part of the user's body by generating the three-dimensional set of surface meshes and computing the geodesic distance of each point path on the set of surface meshes.

One technology uses color and depth information to locate multiple hand areas and face areas by segmenting the human body and then segmenting human's skin-color areas by using the color detection; and categorizes the skin-color areas by using a k-means method; finally, distinguishes hand area or face area in conjunction with the depth information. The technology of using color and depth information to locate hand position uses LUV color space, and couples with mixture of Gaussians model, to find out the skin-color areas; and helped by the depth information to remove background skin areas. In the front skin-color areas, the technology compares size, height, and depth information of any two areas to locate the positions of hands.

Figure 3:
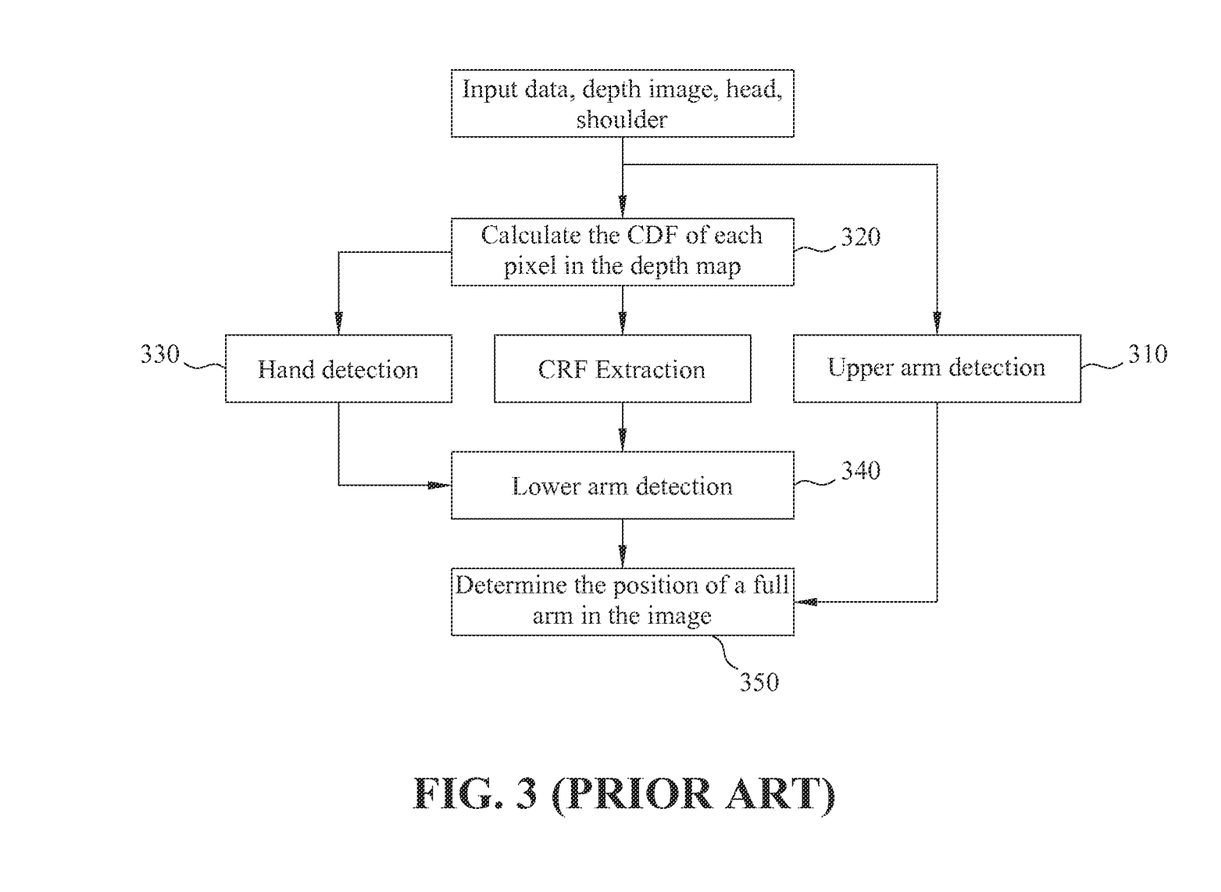
FIG. 3 shows a schematic view of a technique for analyzing an upper arm and a lower arm of a human subject with convex degree features of the depth image.

Another technique analyzes the upper and the lower arms of a human subject with the convex degree feature (CDF) of the depth image. As shown in FIG. 3, this technique performs an upper arm detection 310 from the detected head and shoulder positions, and calculates the convex degree feature of each pixel in the depth map 320. This technique then uses fixed-size inner regions and outer regions, calculates a pixel ratio of depth distribution, and performs a hand detection 330 and a lower arm detection 340 by using these convex degree features to determine the position of a full arm in the image 350 according to the results of the upper arm detection and the lower arm detection.

In the above mentioned image analysis technologies, some technologies may be unable to build a single model to perform comparison due to different distances between the user and the video camera device such that the sizes of the contour shapes of the local areas in the image are not the same. Some technologies may be unable to obtain complete skeleton information of the user due to the shelter in front of the user. Some technologies use skin-color information, and the impact of ambient light may result in a lower recognition rate.

Therefore, it is an important issue on how to design an object positioning technology which may only use the depth image information without establishing user skeleton, and use the real distance information for feature extraction, to positioning near or far objects by only establishing a single model unaffected by the ambient light and shelter.

SUMMARY

The exemplary embodiments of the disclosure may provide a method and apparatus for object positioning by using depth images.

One exemplary embodiment relates to a method for object positioning by using depth images, adapted to an object positioning apparatus. The method is executed by a hardware processor to perform: converting a depth information of each of a plurality of pixels in each of one or more depth images into a real world coordinate; according to the real world coordinate, computing a distance of each of the plurality of pixels to an edge in each of a plurality of directions; assigning a weight to the distance of the each pixel to each edge of a plurality of edges; and according to a weight limit and the weight of the distance of each of the plurality of pixels to each of the plurality of edges, selecting one or more extremity positions of an object.

Another exemplary embodiment relates to a method for object positioning by using depth images, adapted to an object positioning apparatus. The method is executed by a hardware processor to perform: for each of a plurality of pixels in each of one or more depth images, computing a distance of the pixel to an edge in each of a plurality of directions; convening a depth information of the distance of the each pixel to each edge of a plurality of edges into a real world coordinate; assigning a weight to the distance of the each pixel to the each edge; and according to a weight limit and the weight of the distance of each of the plurality of pixels to each of the plurality of edges, selecting one or more extremity positions of an object.

Yet another exemplary embodiment relates to an apparatus for object positioning by using depth images. The apparatus may comprise a hardware processor connected to a depth image capture device. The hardware processor further includes a real-world coordinate computing module and a computing device. The real-world coordinate computing module converts each of a plurality of received depth information into a real world coordinate. The computing device is configured to compute a distance of each of a plurality of pixels in each of one or more depth images captured by the depth image capture device to an edge in each of a plurality of directions, assign a weight to the distance of each pixel to each edge, and select one or more extremity positions of an object according to a weight limit and the weight of the distance of each of the plurality of pixels to each edge in each of the plurality of directions.

DETAILED DESCRIPTION OF DISCLOSED EMBODIMENTS

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The exemplary embodiments in the disclosure provide an object positioning technology that converts the received depth image information into the real world coordinate of each pixel, and then computes a distance of each pixel to an edge in each of a plurality of directions. An edge, such as is a position that the found depth difference of the pixel is greater than a predetermined threshold in one direction. Then the technology assigns a weight to the distance of the pixel to each edge; and according to the weight of the distance and a weight limit, selects one or more extremity positions of an object.

Figure 4:
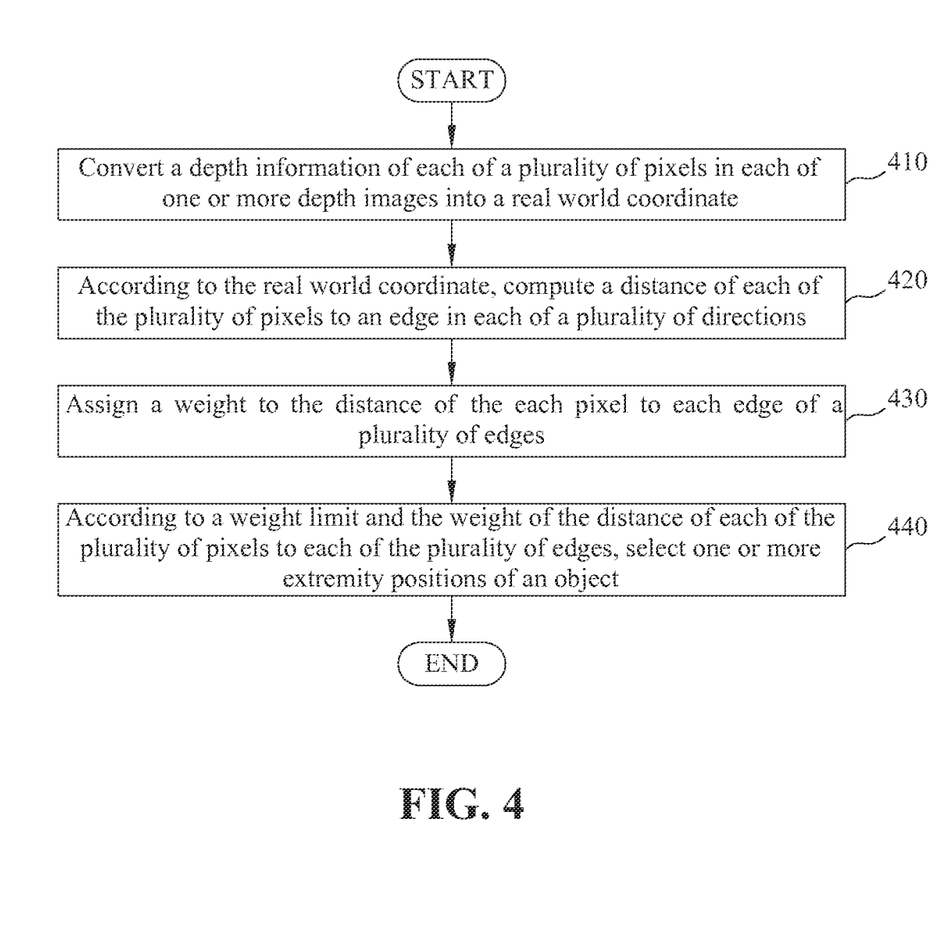
FIG. 4 shows a method for object positioning by using depth images, according to an exemplary embodiment.

In other words, the disclosed object positioning method by using depth images may be as shown in FIG. 4. The method converts a depth information of each of a plurality of pixels in each of one or more depth images into a real world coordinate (step 410), and according to the real world coordinate, computes a distance of each of the plurality of pixels to an edge in each of a plurality of directions (step 420), and assigns a weight to the distance of the each pixel to each edge of a plurality of edges (step 430). And according to a weight limit and the weight of the distance of each of the plurality of pixels to each of the plurality of edges, the method selects one or more extremity positions of an object (step 440). The method is adapted to an object positioning apparatus, and executed by a hardware processor to perform step 410 to step 440. The hardware processor may be, but not limited to, a hardware circuit having computing power, a computer system quipped with at least a central processing unit and memory, and so on.

Figure 5:
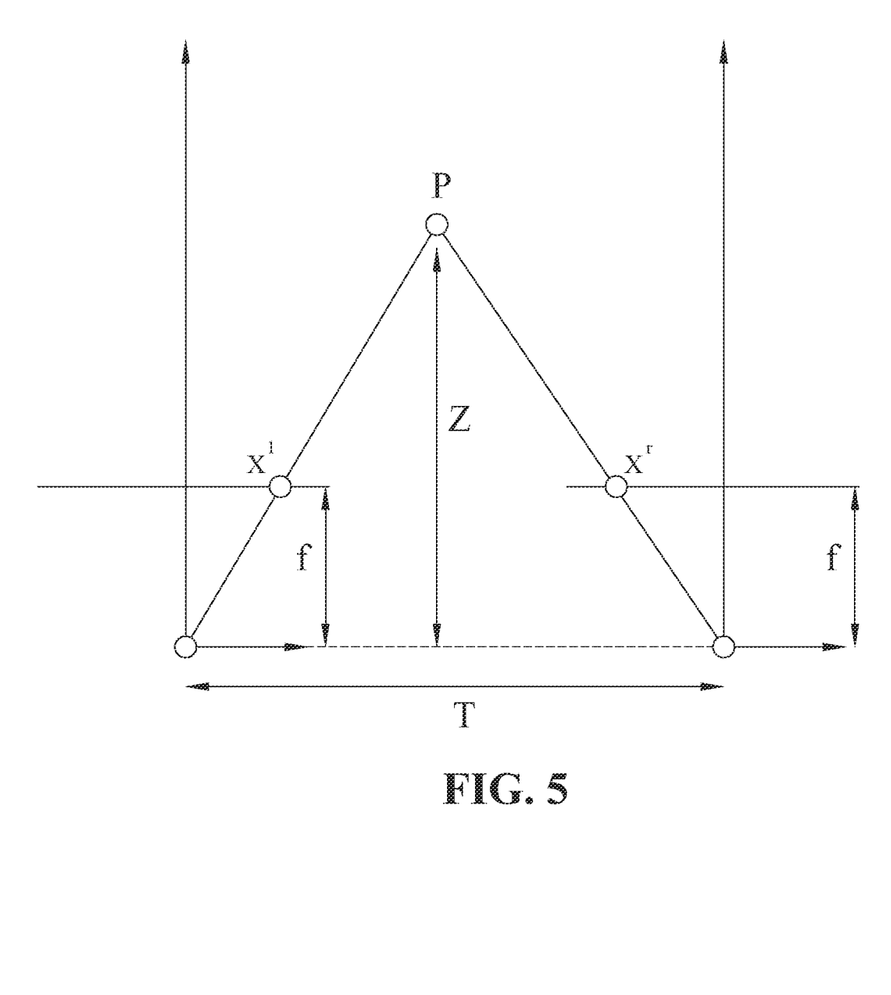
FIG. 5 shows a schematic view on how to convert depth information of a pixel into a real world coordinate, according to an exemplary embodiment.

In step 410, the depth information for each pixel, for example, represents the parallax of the left and the right images (the parallax unit is pixel distance). The parallax of the left and the right images is a pixel distance of a first image and a second image captured by dual video cameras, and the parallax of the left and the right images is converted into a real-world coordinate (the unit of the real world coordinate is cm). In practical applications, there are many ways of obtaining depth images, such as obtaining the depth image with dual video cameras architecture. Take the dual video cameras architecture as an exemplar, FIG. 5 shows a schematic view on how to convert depth information of a pixel into a real world coordinate, according to an exemplary embodiment. Wherein assumes that $x^l$ and $x^r$ are two x-coordinates corresponding to left and right images, respectively, and T is a distance between the left and the right cameras, f is the focal length of the camera. X, Y, and Z are the real world coordinates, and respectively, by taking a reference camera (e.g., the right camera) as an origin. Z is a z-axis coordinate of pixel P corresponding to the two cameras.

According to FIG. 5, the conversion of z-axis coordinate is as follows:

$$\frac{T-(x^l-x^r)}{Z-f} = \frac{T}{Z} \Rightarrow Z = \frac{fT}{x^l-x^r}$$

According to Z coordinate, the X and Y coordinates are converted as follows:

$$\frac{x^r}{f} = \frac{X}{Z} \Rightarrow X = Z\frac{x^r}{f}$$

-continued $$Z = \frac{fT}{x^l - x^r} \Rightarrow X = \frac{x^r T}{x^l - x^r}$$

$$\frac{y^r}{f} = \frac{Y}{Z} \Rightarrow Y = \frac{y^r T}{x^l - x^r}$$

Figure 6:
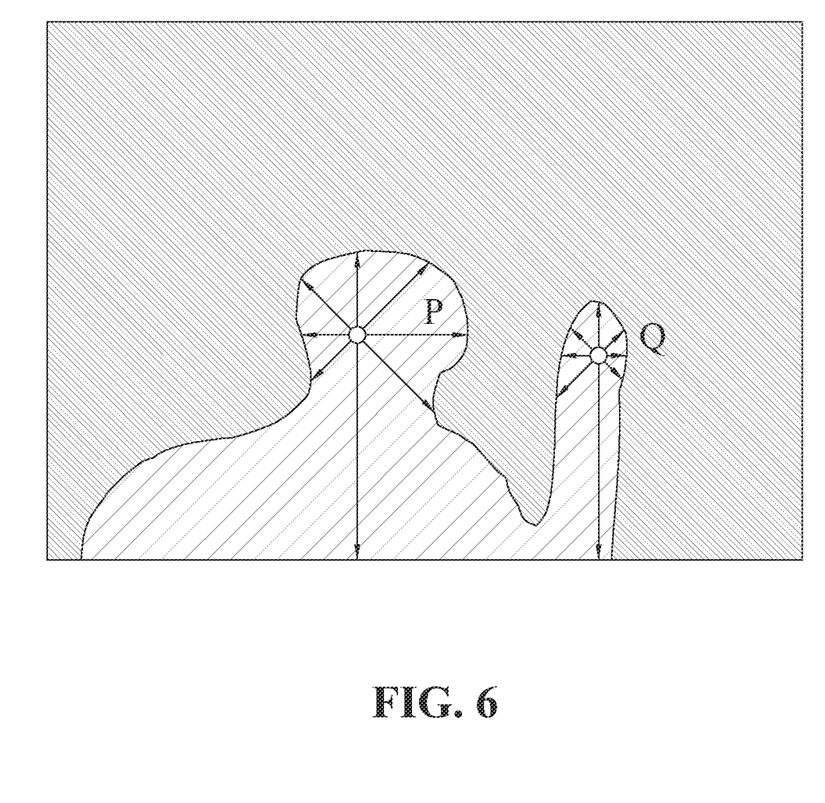
FIG. 6 shows a schematic view illustrating a distance from a pixel to an edge in each of eight directions, according to an exemplary embodiment.

After having obtained the real-world distance of each pixel from a depth image, in accordance with step 420, the method computes a distance of each pixel to an edge in each of a plurality of directions. First, from each of N directions around each pixel, the method locates an extremity position of an edge, wherein the extremity position of the edge has a depth difference is greater than a predetermined threshold. The method then computes and records a true distance from the pixel to each of N extremity positions. FIG. 6 shows a schematic view illustrating a distance from a pixel to an edge in each of eight directions (i.e., N is equal to 8 in this example), according to an exemplary embodiment, Wherein point P and point Q respectively represent any pixel in an image, while each of the arrow lines represents a distance from the pixel to the edge in each of eight directions.

In other words, the steps of computing a distance from a pixel to an edge may include searching at least one pixel in this depth image, along a straight direction based on each pixel in this depth image, until there is a depth information difference between the pixel and each of the at least one pixel exceeds a predetermined threshold, and based on a real world coordinate, computing a distance of the pixel to each of the at the at least one pixel in each of a plurality of directions. Take the FIG. 6 as an exemplar, the method locates the at least one pixel having the depth difference greater than a predetermined threshold in each of the eight directions (N=8) around each pixel. For example, a pixel having the depth difference greater than a predetermined threshold of 7 cm is set as an edge (in other words, it may determine the edge by locating the pixel(s) having a pixel depth difference greater than a predetermined threshold in each direction around each pixel over an image), and the distance between each pixel and this pixel is computed. In the disclosure, the convex degree of a three-dimensional convex of the object may be used as a reference for a threshold setting. For example, assume that an object to-be-identified is the hand part, and the predetermined threshold is 7 cm. When the depth difference between the pixel representing the hand portion and its around background pixel exceeds 7 cm, the pixel representing the hand portion is considered as a convex.

After having computed the distance of each pixel to the edge in N directions, according to the object to be identified, such as the hand part, The method takes the distance of the real world coordinate in each direction as a baseline, and defines a weight $f_n$ of each direction a to be a distance function of the real-world coordinate of this direction n, to satisfy that when the pixel at a correct distance, the higher the weight value, while the larger the distance difference, the smaller the weight value. That is, the distance of the pixel to the edge is within a specified real distance, the assigned weight value is the largest; while the larger the difference away from the specified real distance, the smaller the assigned weight value. The weight value of each pixel may be assigned differently for different directions around each pixel, according to the convex feature of object to be identified.

Figure 7A:
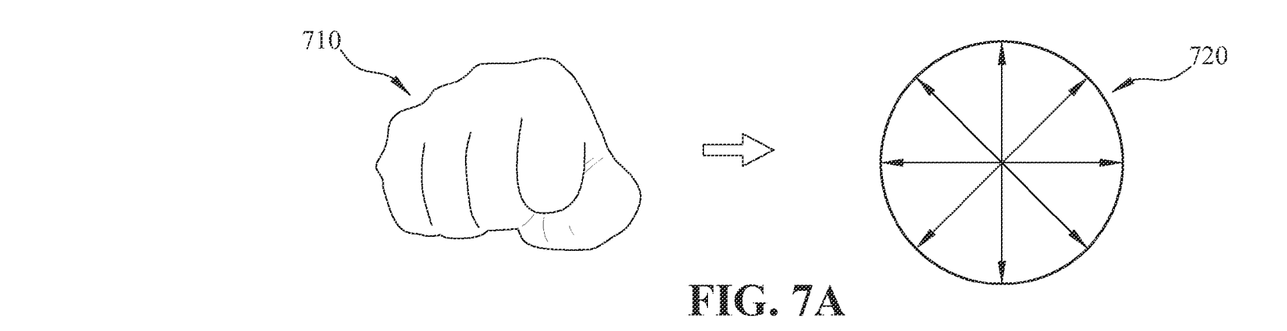
FIG. 7A shows a schematic view illustrating the computed distances of the pixel from each edge in eight directions, by taking the hand part as an identification object and as a convex sphere, according to an exemplary embodiment.

FIG. 7A shows a schematic view illustrating the computed distances of the pixel from each edge in eight directions, by taking the hand part as an identification object and as a convex sphere, according to an exemplary embodiment. As shown in FIG. 7, the hand part 710 is taken as a convex sphere 720 with radius of 6 cm. Therefore, the method may define the weight $f_n$ of each direction n as follows, wherein n=1, 2, . . . , 8, and $f_n$ represents the weight functions of eight directions (such as eight arrows of the convex sphere 720)

$$f_n(d) = \begin{cases} 1 - (d-6)^3 / Norn^3, & \text{if } d > 6 \\ 1 - (d-6)^4 / Norn^3, & \text{otherwise} \end{cases}$$

Wherein d is the distance from the pixel to the edge for the direction n, Norn is equal to 6 and is a normalized parameter. The weight value is the smallest when the distance of the pixel to the edge is greater than (6+Norn) or less than (6−Norn).

Figure 7B:
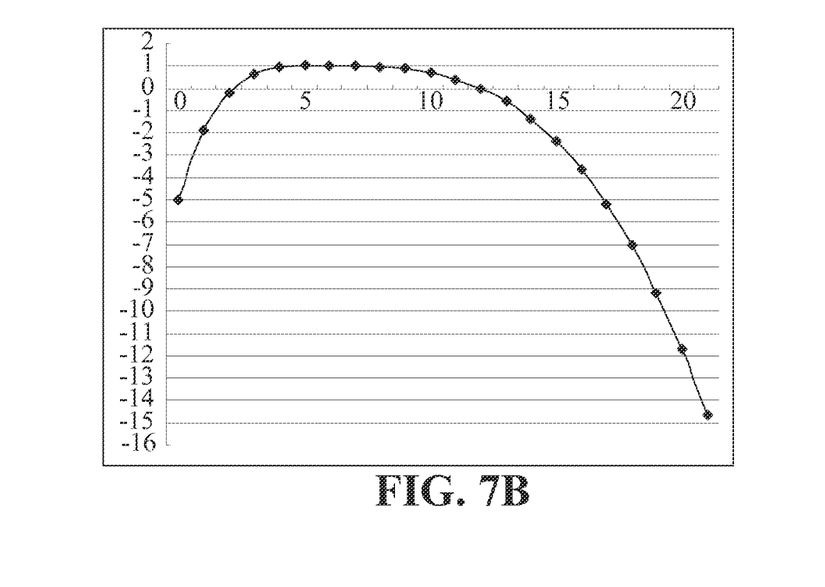
FIG. 7B shows the distribution of a weight function $f_n(d)$, according to an exemplary embodiment.

FIG. 7B shows the distribution of a weight function $f_n(d)$, according to an exemplary embodiment. As shown in FIG. 7B, the horizontal axis represents the distance d of the pixel to the edge, and the vertical axis represents the weight function $f_n(d)$. The implication of this weight function $f_n(d)$ is that, when distance d of the pixel to the edge is greater than 6 cm, weight $f_n(d)$ is computed in third power; when distance d is equal to 6 cm, the weight value is the largest; when d is less than 6 cm, weight fn(d) is computed in fourth power, such that the weight value is smaller for d being in the range of 0 to 6 cm. And, the weight value is computed in fourth power for the different distances to increase the weight differences. After the method gives the weight value for each direction around each pixel, the total sum $S_w$ of the weight value of each direction around this pixel is computed. For example, the sum of distance weight values of the eight directions may be computed, but not limited to, as follows.

$$S_w = \Sigma_{i=1}^{8} f_n(d)$$

Figure 8:
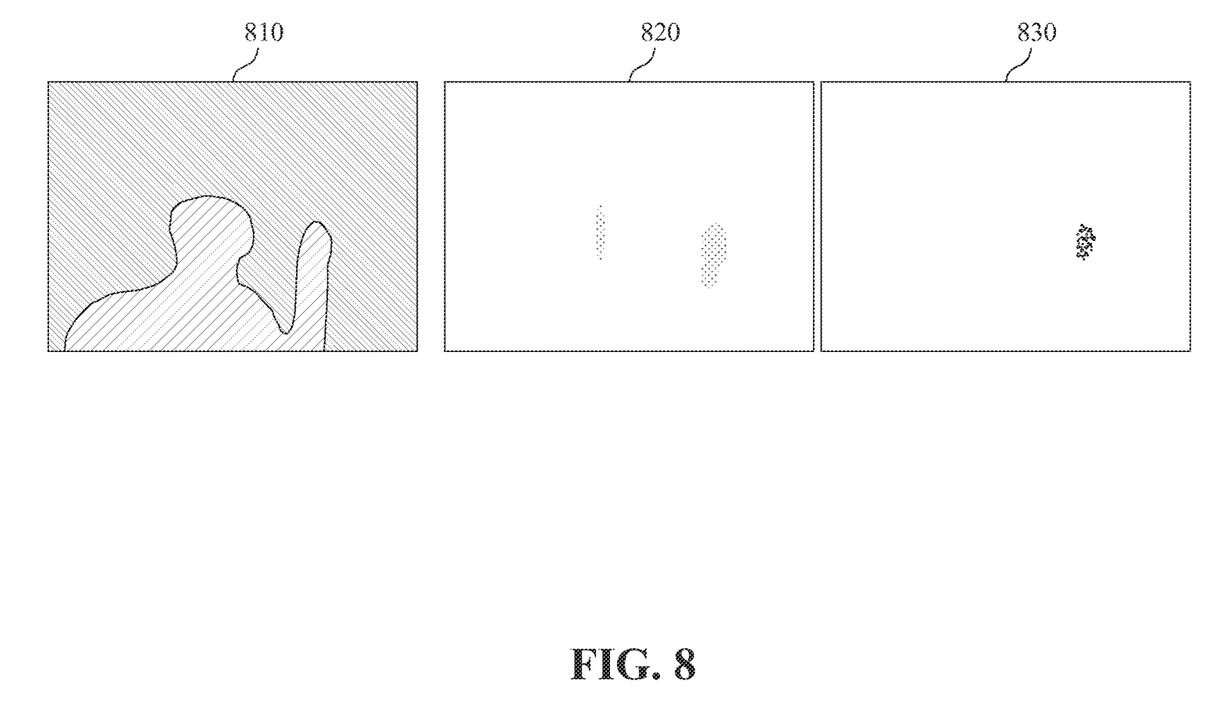
FIG. 8 shows a schematic view illustrating a depth image is converted to a weighted image after conversion and smoothing, according to an exemplary embodiment.

According to step 440, the position of an object to be identified may be found through the summed weight value $S_w$ and a weight limit as following. FIG. 8 shows a schematic view illustrating a depth image is converted to a weighted image after conversion and smoothing, according to an exemplary embodiment. First, according to the weight value of each pixel computed by using the above steps, the depth image 810 is converted into a weighted image 820, as shown in FIG. 8. According to an exemplary embodiment, the weight value of each pixel is normalized. For example, each weight value is converted into a range of 0 to 255, to generate a map of a weighted image, and the noises of small areas may be also removed through a smoothing processing (for example, computing the average feature weights of 20×20 areas with an image integration method), so that the weighted image after smoothing 830 is obtained. An exemplary calculation formula for the normalized weight value of each pixel is $(S_w/N) \times 2N$, wherein there are N directions around the pixel.

Figure 9A:
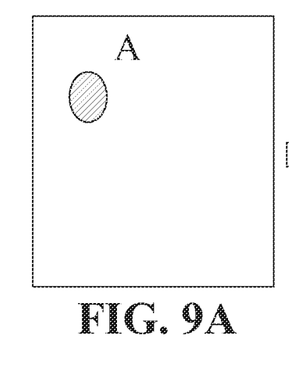
FIG. 9A-FIG. 9D show schematic views of selecting candidate extremity positions of an object to be identified according to the weight value of the distance of the pixel to the edge, according to an exemplary embodiment.

After the weighted images after smoothing 830 is obtained, the method sets a weight limit (such as predefined as 100), and in the weighted image after smoothing 830, selects one or more pixels with a largest weight value within a specified area range as candidate extremity positions of the object to be identified. For example, the weighted image after smoothing 830 is scanned from top left to bottom right, any pixel with a weight value exceeding the weight limit is considered as a candidate extremity position, and whether the exited candidate extremity position located within that specified area range (such as 50×50) is checked. When there exits this candidate extremity position, the one with the greatest weight value is selected as a candidate extremity position. FIG. 9A-FIG. 9) show schematic views of selecting candidate extremity positions of an object to be identified according to the weight value of the distance of the pixel to the edge, according to an exemplary embodiment.

Figure 9B:
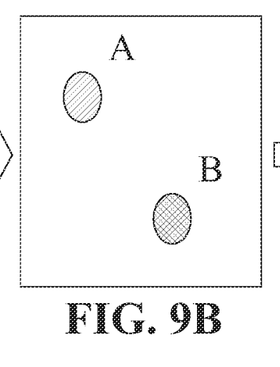
Figure 9C:
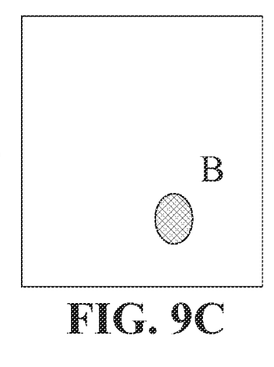
Figure 9D:
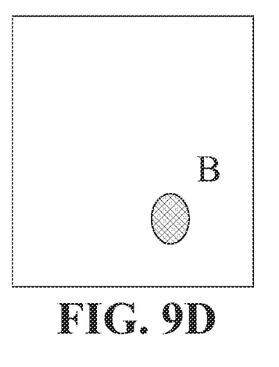

As shown in FIG. 9A-FIG. 9D, assuming that during the scanning process, pixel point A has been listed as a candidate extremity position (as shown in FIG. 9A), the pixel point B is found through scanning down, the weight value of the pixel point B is larger and the distance of the pixel point B to the pixel point A is within a specific area such as a 50×50 area (as shown in FIG. 9B), then the pixel point B is reserved as a candidate extremity position and the pixel point A is removed (as shown in FIG. 9C), and finally, the pixel point B having the largest weight value is selected as the extremity position of the object to be identified (as shown in FIG. 9D). If the distance between two pixel points A, B exceeds the specific area such as 50×50 area, then both pixel points A, B are candidate extremity positions, that is, both are the terminal positions of the object to be identified. In other words, according to the disclosed exemplary embodiments, in a specified area range, the pixel(s) having the largest weight value may be selected for determining the extremity position of the object.

Figure 10:
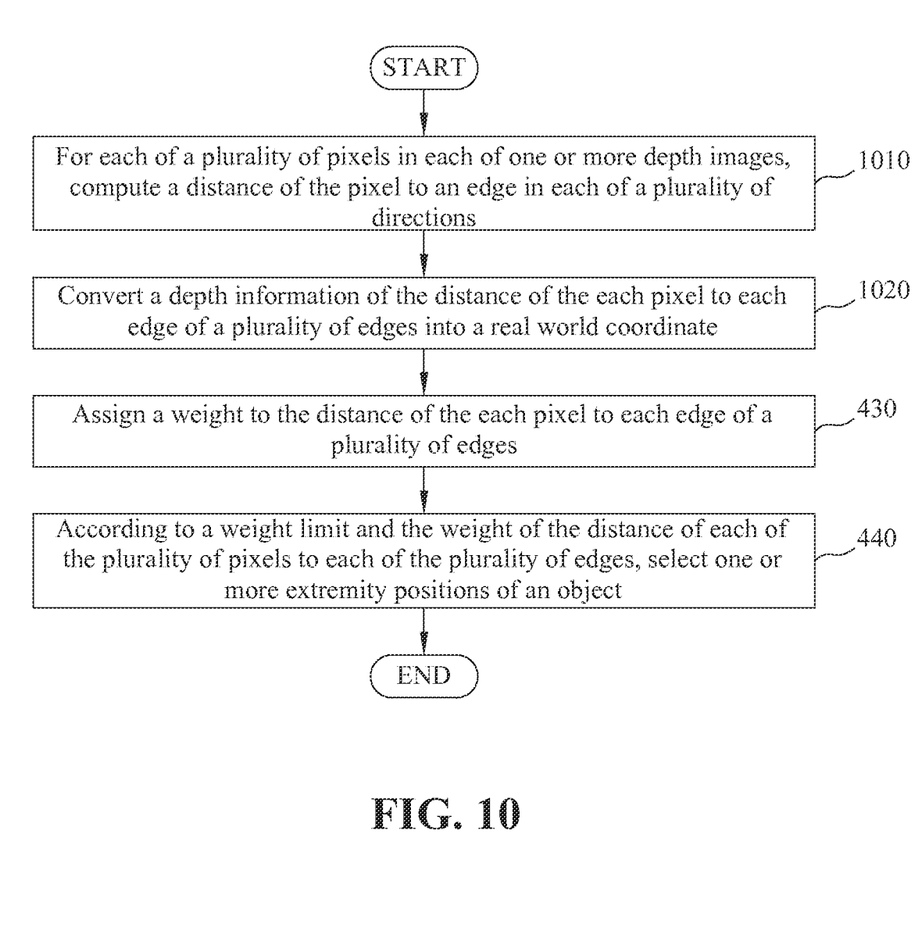
FIG. 10 shows a method for object positioning by using depth images, according to an exemplary embodiment.

In the above description, the two step of converting the depth information into a real-world coordinate for the depth image and computing a distance of the pixel to the edge according to a real-world coordinate may also be changed as computing a distance of the pixel to the edge and then converting the distance into a real-world coordinate. In other words, according to another exemplary embodiment, a method for object positioning by using depth images may be shown as FIG. 10. For each pixel of a plurality of pixels in each of one or more depth images, the method in FIG. 10 computes a distance of said each pixel to an edge in each of a plurality of directions (step 1010); then converts depth information of the distance of the each pixel to each edge into a real world coordinate (step 1020). Then step 430 and step 440 are performed, as shown in FIG. 10.

In step 1020, for example, a real-world distance Rd from the target pixel coordinates $(x_1, y_1, d_1)$ to an edge pixel coordinates $(x_2, y_2, d_2)$ may be obtained in the following manner. First, a real world coordinates $(X_1, Y_1, Z_1)$ of the target pixel coordinate and a real world coordinate $(X_2, Y_2, Z_2)$ of the edge pixel coordinate may be obtained by the computation of the previously described conversion formula. Then the real-world distance Rd is computed by using such as an Euclidean distance formula. That is the following computation formula.

$$(X_1, Y_1, Z_1) = \left(\frac{x_1 T}{d_1}, \frac{y_1 T}{d_1}, \frac{fT}{d_1}\right)$$

$$(X_2, Y_2, Z_2) = \left(\frac{x_2 T}{d_2}, \frac{y_2 T}{d_2}, \frac{fT}{d_2}\right)$$

$$Rd = \sqrt{(X_1 - X_2)^2 + (Y_1 - Y_2)^2 + (Z_1 - Z_2)^2}$$

Figure 11:
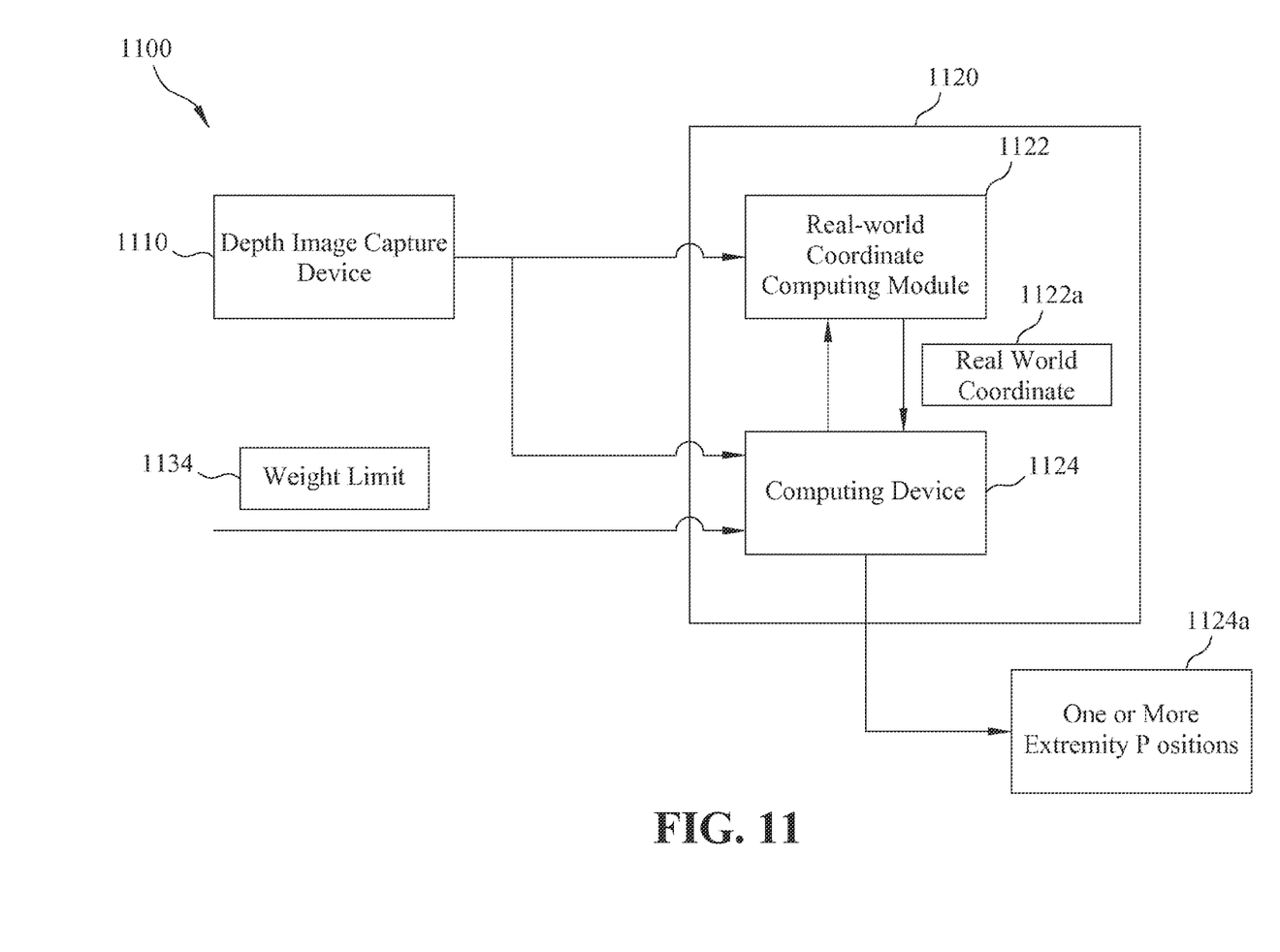
FIG. 11 shows an apparatus for object positioning by using depth images, according to an exemplary embodiment.

Accordingly, FIG. 11 shows an apparatus for object positioning by using depth images, according to an exemplary embodiment. Refer to FIG. 11, an object positioning apparatus 1100 comprises a hardware processor 1120, and the hardware processor 1120 is connected to a depth image capture device 1110. The hardware processor 1120 further includes a real-world coordinate computing module 1122 and a computing device 1124. The real-world coordinates computing module 1122 connects to the depth image capture device 1110 and the computing device 1124, respectively, and converts each of a plurality of received depth information into a real world coordinate 1122a. The computing device 1124 is configured to compute a distance of each of a plurality of pixels in each of one or more depth images captured by the depth image capture device 1110 to an edge in each of a plurality of directions, assign a weight to the distance of each pixel to each edge, and select one or more extremity positions 1124a of an object according to a weight limit 1134 and the weight of the distance of each of the plurality of pixels to each edge in each of the plurality of directions.

The object positioning apparatus 1100 may further include the depth image capture device 1110 to capture a plurality of depth images. The depth image capture device 1110 may be, but not limited to, a depth sensor, or an image capture device having dual video cameras architecture. The pixel information of the captured depth image is a true distance with respect to the depth sensor or a pixel distance between a first image and a second image captured by the dual video camera. Each of depth information comes from a plurality of depth image captured by the depth image capture device 1110, or is the distance of each pixel to each edge computed by the computing device 1124.

The real-world coordinates computing module 1122 may convert the depth information of pixel in the depth images captured from the depth image capture device 1110 into the real-world coordinate, and outputs to the computing device 1124. Or the computing device 1124 computes the distance of the pixel to the edge, and then the real-world coordinates computing module 1122 converts the distance into a distance of the real-world coordinate. As pervious mentioned, the pixel with depth difference of each direction around the pixel greater than a predetermined threshold is taken as an edge. How the computing device 1124 computes the distance of each pixel to an edge in each direction, gives a weight value, and selects one or more extremity positions of an object according to weight values of these distances and a weight limit have been described in the foregoing exemplary embodiments, and is not repeated here.

Therefore, the disclosed exemplary embodiments of the object positioning method and apparatus only use the depth image information so that the technology is not unaffected by ambient light. This technology does not need to establish user skeleton so that unaffected by shelter, and it use the real distance information for feature extraction to simply create a single model for estimating and tracking near or far objects to be identified. The disclosed embodiments may be applied in the object positioning of gesture control system, appliance control, interactive advertising billboards, 3C industry fields, and so on.

In summary, the disclosed exemplary embodiments provide a method and apparatus for object positioning by using depth images. The technology converts depth information of each of a plurality of pixels in each of one or more depth images into a real world three-dimensional coordinate, and computes a distance of each pixel to an edge in each of a plurality of directions, and assigns a weight to the distance of each pixel to each edge. Based on the weight of the distance of each pixel to each edge, the disclosed exemplary embodiments determine the position of an object to be identified. This technology has features that are not subject to the influence of ambient light and shelter, and only create a single model to estimate and track near or far objects to be identified.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for object positioning by using depth images, adapted to an apparatus for positioning an object, and the method being executed by a hardware processor to perform:
   converting a depth information of each of a plurality of pixels in each of one or more depth images into a real world coordinate;
   according to the real world coordinate, computing a distance of each of the plurality of pixels to a plurality of edges of the object in each of a plurality of directions around each of the plurality of pixels;
   assigning a weight to the distance of the each pixel to each edge of a plurality of edges; and
   according to a weight limit and the weight of the distance of each of the plurality of pixels to each of the plurality of edges, selecting within a specified area range at least one pixel having a largest weight to determine one or more extremity positions of the object.

2. The method as claimed in claim 1, wherein the depth information of the pixel represents a parallax between a left image and a right image, and said parallax between the right image and the left image is a pixel distance between a first image and a second image captured by dual video cameras.

3. The method as claimed in claim 1, wherein computing the distance of the pixel to the edge in each of the plurality of directions further comprises:
   computing by searching along a straight direction starting from the pixel in the depth image, until there is a depth information difference between each of at least one pixel and the pixel exceeds a predetermined threshold; and
   based on the real-world coordinate, computing at least one distance between the pixel and the at least one pixel.

4. The method as claimed in claim 1, wherein the method assigns different weights to different distances of the pixel to different edges in different directions.

5. The method as claimed in claim 1, wherein the method assigns a largest weight to a distance of the pixel to the edge when the distance is at a specified real distance, and assigns a smaller weight to the distance when a difference between the distance and the specified real distance is larger.

6. The method as claimed in claim 1, wherein said selecting the one or more extremity positions of said object further includes:
   checking each of the plurality of pixels in a weighted image after smoothing, and determining pixels with a weight exceeding said weight limit as a candidate extremity position of said object.

7. A method for object positioning by using depth images, adapted to an apparatus for positioning an object, and the method being executed by a hardware processor to perform:
   for each of a plurality of pixels in each of one or more depth images, computing a distance of the pixel to a plurality of edges of the object in each of a plurality of directions around each of the plurality of pixels;
   converting a depth information of the distance of the each pixel to each edge of a plurality of edges into a real world coordinate;
   assigning a weight to the distance of the each pixel to the each edge; and
   according to a weight limit and the weight of the distance of each of the plurality of pixels to each of the plurality of edges, selecting within a specified area range at least one pixel having a largest weight to determine one or more extremity positions of the object.

8. The method as claimed in claim 7, wherein the method assigns different weights to different distances of the pixel to different edges in different directions.

9. The method as claimed in claim 7, wherein the method assigns a largest weight to a distance of the pixel to the edge when the distance is at a specified real distance, and assigns a smaller weight to the distance when a difference between the distance and the specified real distance is larger.

10. The method as claimed in claim 7, wherein the method locates at least one pixel having a depth difference greater than a predetermined threshold in each of the plurality of directions around each of the plurality of pixels to determine said edge.

11. An apparatus for positioning an object by using depth images, comprising:
    a hardware processor connected to a depth image capture device, wherein said hardware processor further includes:
    a real-world coordinate computing module that converts each of a plurality of received depth information into a real world coordinate, and
    a computing device configured to compute a distance of each of a plurality of pixels in each of one or more depth images captured by the depth image capture device to a plurality of edges of the object in each of a plurality of directions around each of the plurality of pixels, assign a weight to the distance of each pixel to each edge, and select within a specified area range at least one pixel having a largest weight to determine one or more extremity positions of the object according to a weight limit and the weight of the distance of each of the plurality of pixels to each edge in each of the plurality of directions.

12. The apparatus as claimed in claim 11, wherein each of the plurality of received depth information comes from the one or more depth images captured by said depth image capture device, or is the distance of said each pixel to each edge calculated by said computing device.

13. The apparatus as claimed in claim 11, wherein said depth image capture device is a depth sensor, or an image capture device having dual video camera architecture.

14. The apparatus as claimed in claim 13, wherein the pixel information of each of the plurality of depth images is a real distance with respect to said depth sensor.

15. The apparatus as claimed in claim 13, wherein the pixel information of each of the plurality of depth images is a pixel distance of a first image and a second image captured by dual video cameras.

16. The apparatus as claimed in claim 11, wherein said hardware processor is one of a hardware circuit having a computing ability and a computer system quipped with at least one central processing unit and at least one memory.

17. The apparatus as claimed in claim 11, wherein said apparatus further includes said depth image capture device to capture the one or more depth images.

18. The apparatus as claimed in claim 11, wherein said apparatus locates at least one pixel having a depth difference greater than a predetermined threshold in each of the plurality of directions around each pixel to determine said edge.

* * * * *